US008512921B2

United States Patent
Lee et al.

(10) Patent No.: US 8,512,921 B2
(45) Date of Patent: Aug. 20, 2013

(54) PIGMENT DISPERSION COMPOSITION, COLOR RESIST COMPOSITION INCLUDING THE SAME, AND COLOR FILTER USING THE SAME

(75) Inventors: Chang-Min Lee, Uiwang-si (KR); Jae-Hyun Kim, Uiwang-si (KR); Eui-June Jeong, Uiwang-si (KR); Kil-Sung Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 301 days.

(21) Appl. No.: 13/095,095

(22) Filed: Apr. 27, 2011

(65) Prior Publication Data

US 2011/0200921 A1 Aug. 18, 2011

Related U.S. Application Data

(63) Continuation-in-part of application No. PCT/KR2008/007890, filed on Dec. 31, 2008.

(30) Foreign Application Priority Data

Oct. 29, 2008 (KR) .................. 10-2008-0106628

(51) Int. Cl.
  *G02B 5/20* (2006.01)
(52) U.S. Cl.
  USPC ............................................. 430/7; 106/493
(58) Field of Classification Search
  None
  See application file for complete search history.

(56) References Cited

U.S. PATENT DOCUMENTS

| 7,618,486 | B2 | 11/2009 | Lee et al. | |
|---|---|---|---|---|
| 8,216,770 | B2 | 7/2012 | Oh et al. | |
| 2003/0189682 | A1 | 10/2003 | Yamagata et al. | |
| 2007/0101903 | A1* | 5/2007 | Lee et al. | ...... 106/476 |
| 2007/0154820 | A1* | 7/2007 | Kang et al. | ......... 430/7 |

FOREIGN PATENT DOCUMENTS

| CN | 1867640 A | 11/2006 |
|---|---|---|
| CN | 101206398 A | 6/2008 |
| JP | 2000-160084 A | 6/2000 |
| JP | 2002-031713 A | 1/2002 |
| JP | 2003-035815 A | 2/2003 |
| JP | 2004-182787 A | 7/2004 |
| JP | 2004-339355 A | 12/2004 |
| JP | 2004-339368 A | 12/2004 |
| KR | 10-2007-0115762 A | 12/2007 |
| KR | 10-2007-0116183 A | 12/2007 |
| KR | 10-2008-0055111 A | 6/2008 |
| TW | 200819473 A | 5/2008 |
| TW | 200831615 A | 8/2008 |
| WO | 2010/050650 A1 | 5/2010 |

OTHER PUBLICATIONS

International Search Report and Written Opinion in counterpart International Application No. PCT/KR2008/007890 dated Sep. 1, 2009, pp. 1-6.
Chinese Search Report in counterpart Chinese Application No. 2008801317609 dated Nov. 12, 2012, pp. 1-2.

* cited by examiner

*Primary Examiner* — John A. McPherson
(74) *Attorney, Agent, or Firm* — Summa, Additon & Ashe, P.A.

(57) ABSTRACT

The present invention related to a pigment dispersion composition, a color resist composition including the same, and a color filter fabricated by using the color resist composition. The pigment dispersion composition includes [A] a pigment, [B] a dispersing agent, [C] a cardo-based binder resin, and [D] a solvent.

11 Claims, 4 Drawing Sheets

PIGMENT DISPERSION COMPOSITION, COLOR RESIST COMPOSITION INCLUDING THE SAME, AND COLOR FILTER USING THE SAME

CROSS-REFERENCE TO RELATED APPLICATIONS

This application is a continuation-in-part of International Application No. PCT/KR2008/007890, filed Dec. 31, 2008, pending, which designates the U.S., published as WO 2010/050650, and is incorporated herein by reference in its entirety, and claims priority therefrom under 35 USC Section 120. This application also claims priority under 35 USC Section 119 from Korean Patent Application No. 10-2008-0106628, filed Oct. 29, 2008, in the Korean Intellectual Property Office, the entire disclosure of which is also incorporated herein by reference.

FIELD OF THE INVENTION

The present invention relates to a pigment dispersion composition, a color resist composition including the same, and a color filter fabricated using the same.

BACKGROUND OF THE INVENTION

An image sensor is a part for photographing images in a device such as a portable phone camera or a digital still camera (DSC). An image sensor can be classified as a charge-coupled device (CCD) image sensor or a complementary metal oxide semiconductor (CMOS) image sensor, depending on the manufacturing process and the method of using the same.

A color photographing part for a charge-coupled device (CCD) image sensor or a complementary metal oxide semiconductor (CMOS) image sensor includes color filters, each having additive mixing primary color filter segments of red, green, and blue, and the colors are separated.

A recent color filter embodied in the color photographing part has a pattern size of 2 μm or less, which is 1/100th to 1/200th of the pattern size of a conventional color filter pattern for LCDs. Accordingly, increased resolution and decreased pattern residues are important factors for determining the performance of a device.

Color filters can be formed using a resist composition including a colorant (which can be in the form of a pigment dispersion), a photoinitiator, a monomer, and a binder. Currently, factors such as the types and amounts of the resist composition components are believed to impact the quality of resolution and the amount of pattern residues.

For example, in order to provide a fine pattern, the pigment dispersion solution should have a small particle diameter to minimize pattern residues when developing an image. In order to decrease the particle diameter of the pigment dispersed in the pigment dispersion solution, the pigment should have a small primary particle diameter, and the kind and amount of a dispersing agent should be considered.

Current pigments for an electron material can have a primary particle size of approximately 50 nm. Therefore, when they are dispersed, they can have a smaller dispersion particle size.

A dispersing agent is used to maintain dispersion of a pigment by introducing a functional group that can be adhered to the surface of the pigment and adjusting pigment particles to have a predetermined distance using steric hindrance effects. The dispersing agents can be classified as polyester resins, acrylic resins, modified urethane resins, polyethers, and the like. These resins can provide adequate steric hindrance to a pigment.

Accordingly, a pigment can be dispersed when the pigment has a small primary particle size and is used with a dispersing agent that adheres to the surface of the pigment to help disperse the pigment particles by steric hindrance

SUMMARY OF THE INVENTION

One embodiment of the present invention provides a pigment dispersion composition that can exhibit excellent pigment dispersion, excellent development properties, decrease pattern residue, improve resolution, and/or provide a fine (small) pattern size.

Another embodiment of the present invention provides a resist composition for a color filter including the pigment dispersion composition.

Another embodiment of the present invention provides a color filter made using the resist composition for a color filter.

The embodiments of the present invention are not limited to the above technical purposes, and a person of ordinary skill in the art can understand other technical purposes.

According to one embodiment of the present invention, a pigment dispersion composition is provided that includes [A] a pigment, [B] a dispersing agent of the following Formula 1, [C] a cardo-based binder resin of the following Formula 2, and [D] a solvent.

[Chemical Formula 1]

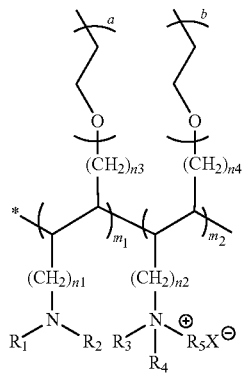

In the above Formula 1, $R_1$ to $R_5$ are the same or different and are independently hydrogen, substituted or unsubstituted alkyl, substituted or unsubstituted alkenyl, substituted or unsubstituted alkynyl, substituted or unsubstituted aryl, substituted or unsubstituted heteroaryl, substituted or unsubstituted arylalkyl, substituted or unsubstituted cycloalkyl, substituted or unsubstituted heterocycloalkyl, substituted or unsubstituted cycloalkenyl, substituted or unsubstituted cycloalkynyl, substituted or unsubstituted alkoxy, substituted or unsubstituted alkylamino, substituted or unsubstituted alkoxy amino, or substituted or unsubstituted alkanol, X is halogen, sulfone ($-S=O)_2H$), alkylsulfone, or hydroxy, $m_1$ ranges from 30 to 100 mol %, $m_2$ ranges from 0 to 70 mol %, $n_1$ to $n_4$ are the same or different and are independently integers of 1 to 20, and a and b are the same or different and are independently integers of 0 to 18.

[Chemical Formula 2]

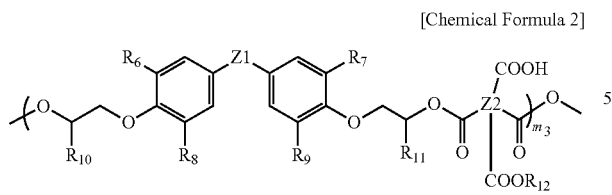

In the above Formula 2, $R_6$ to $R_9$ are the same or different and are independently hydrogen, halogen, or substituted or unsubstituted alkyl, $R_{10}$ and $R_{11}$ are the same or different and are independently $CH_2OR_{13}$ wherein $R_{13}$ is acryl, vinyl, or methacryl, $R_{12}$ is hydrogen, alkyl, acryl, vinyl, or methacryl, $Z_1$ is CO, $SO_2$, $CR_{14}R_{15}$, $SiR_{16}R_{17}$ wherein $R_{14}$ to $R_{17}$ are the same or different and are independently hydrogen, fluoroalkyl, or alkyl, O, a single bond, or a unit represented by one of the following Formulae 4 to 14, $Z_2$ is a moiety derived from acid dianhydride, and $m_3$ is an integer ranging from 1 to 40.

[Chemical Formula 4]

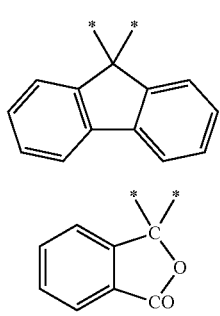

[Chemical Formula 5]

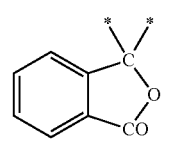

[Chemical Formula 6]

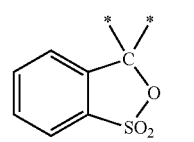

[Chemical Formula 7]

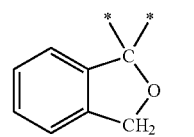

[Chemical Formula 8]

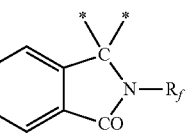

wherein in the above Formula 8, $R_1$ is hydrogen, ethyl, $C_2H_4Cl$, $C_2H_4OH$, $CH_2CH=CH_2$, or phenyl,

[Chemical Formula 9]

[Chemical Formula 10]

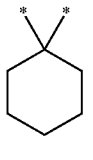

[Chemical Formula 11]

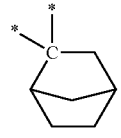

[Chemical Formula 12]

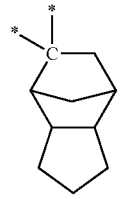

[Chemical Formula 13]

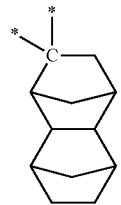

[Chemical Formula 14]

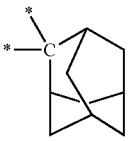

Another embodiment of the present invention provides a resist composition for a color filter including the pigment dispersion composition.

A further embodiment of the present invention provides a color filter made using the resist composition for a color filter.

Further embodiments of the present invention will also be described in detail.

According to the embodiment of the present invention, a pigment dispersion composition can be finely dispersed. When the pigment dispersion composition is prepared as a color resist composition, the color resist composition can form a fine pattern with high resolution but has remarkably decreased residue. Accordingly, when it is used for a solid image sensor and a color filter for a metal oxide semiconductor image sensor, or an LCD display device, it can accomplish excellent sensitivity and image resolution.

DETAILED DESCRIPTION OF THE INVENTION

Figure 1:
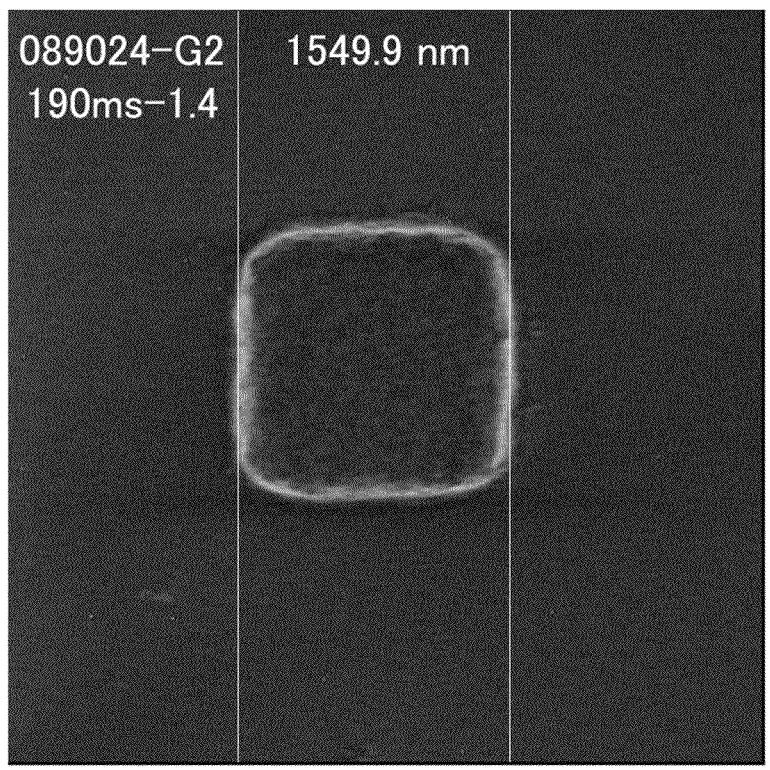
FIG. 1 is a SEM (scanning electron microscope) photograph of a pattern fabricated using the color resist including the pigment dispersion composition according to Example 1.

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements. Like numbers refer to like elements throughout the specification.

The pigment dispersion composition according to one embodiment of the present invention includes [A] a pigment, [B] a dispersing agent of the following Formula 1, [C] a cardo-based binder resin of the following Formula 2, and [D] a solvent.

As used herein, when a specific definition is not otherwise provided, the term "alkyl" refers to C1 to C15 alkyl, the term "alkenyl" refers to C2 to C16 alkenyl, the term "alkynyl" refers to C2 to C16 alkynyl, the term "aryl" refers to C6 to C18 aryl, the term "heteroaryl" refers to C2 to C16 hetero aryl, the term "arylalkyl" refers to C7 to C18 arylalkyl, the term "cycloalkyl" refers to C3 to C15 cycloalkyl, the term "heterocycloalkyl" refers to C3 to C20 heterocycloalkyl, the term "cycloalkenyl" refers to C3 to C15 cycloalkenyl, the term "cycloalkynyl" refers to C6 to C15 cycloalkynyl, the term "alkoxy" refers to C1 to C20 alkoxy, and the term "alkanol" refers to C1-C20 alkanol.

As used herein, when a specific definition is not otherwise provided, the terms heteroaryl and heterocycloalkyl refer to alkyl and cycloalkyl, respectively, including 1 to 3 heteroatoms selected from the group consisting of N, O, S, P, and combinations thereof.

As used herein, when a specific definition is not otherwise provided, the term "substituted" refers to one substituted with halogen (F, Br, Cl, or I), hydroxyl, alkoxy, nitro, cyano, amino, azido, amidino, hydrazino, hydrazono, carbonyl, carbamyl, thiol, ester, carboxyl or a salt thereof, sulfonic acid or a salt thereof, phosphoric acid or a salt thereof, C1 to C15 alkyl, C2 to C16 alkenyl, C2 to C16 alkynyl, C6 to C18 aryl, C7 to C18 arylalkyl, C3 to C15 cycloalkyl, C3 to C15 cycloalkenyl, C6 to C15 cycloalkynyl, or a combination thereof.

As used herein, where a specific definition is not otherwise provided, the term "vinyl" refers to the radical —CH=CH$_2$, the term "acryl" refers to the radical —C(O)—CH=CH$_2$ derived from acrylic acid, and the term "methacryl" refers to the radical —C(O)—C(CH$_3$)=CH$_2$ derived from methacrylic acid.

Hereinafter, the components of the pigment dispersion composition according to one embodiment of the present invention are illustrated in detail.

[A] Pigment

The pigment may be an organic pigment, an inorganic pigment, or a combination thereof. Specific examples of the pigment include without limitation red dipyrrolopyrrol pigments such as C. I. red pigments 254, 255, 264, 270, or 272; red anthraquinone pigments such as C. I. red pigment 177 or 89; green halogen-substituted copper phthalocyanine pigments such as C. I. green pigment 36 or C. I. green pigment 7; blue copper phthalocyanine pigments such as C. I. blue pigment 15:6, 15, 15:1, 15:2, 15:3, 15:4, 15:5, or 16; yellow isoindoline pigments such as C. I. yellow pigment 139; yellow quinophthalone pigment such as C. I. yellow pigment 138; yellow nickel complex pigment such as C. I. yellow pigment 150, and the like. The pigments may be used singularly or in combination.

Optionally, the pigment may be pretreated with water-soluble inorganic salts and a wetting agent.

When the pigment is pretreated, it can have a finer primary particle size. This pretreatment process can include a step S1 of kneading a pigment with a water-soluble inorganic salt and a wetting agent and a step S2 of filtrating and washing the resultant pigment.

The kneading may be performed at a temperature of about 40 to about 100° C.

The water-soluble inorganic salt can be added to a pigment, and examples thereof include without limitation sodium chloride, potassium chloride, and the like, and combinations thereof.

The wetting agent may be added along with the water-soluble inorganic salt. The wetting agent can promote uniform mixing of the pigment with the inorganic salt and pulverization. Examples of the wetting agent include without limitation alkylene glycol monoalkyl ethers such as ethylene glycol monoethyl ether, propylene glycol monomethyl ether, diethylene glycol monomethyl ether, and the like, and alcohols such as ethanol, isopropanol, butanol, hexanol, cyclohexanol, ethylene glycol, diethylene glycol, polyethylene glycol, glycerine polyethylene glycol, and the like. These may be used singularly or in combination.

The average particle diameter of the pigment can be measured after the kneading using a transmission electron microscope (TEM).

The filtration and washing process can be performed by washing the inorganic salt using water or other suitable washing agent known in the art.

According to exemplary embodiments of the present invention, the pigment can have an average particle diameter (D50) ranging from about 30 to about 100 nm. In some embodiments, the pigment can have an average particle diameter of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 nm. Further, according to some embodiments of the present invention, the average particle diameter of the pigment can be in a range from about any of the foregoing amounts to about any other of the foregoing amounts.

When the pigment has an average particle diameter (D50) of less than about 30 nm, the prepared pattern can have decreased durability with regard to heat-resistance, photoresistance, and the like. When the pigment has an average particle diameter of greater than about 100 nm, it can be difficult to form a fine pattern.

[B] Dispersing Agent

The dispersing agent may be represented by the following Formula 1.

The dispersing agent represented by the following Formula 1 (also referred to herein as the first dispersing agent) can provide dispersion stability for a pigment dispersion composition and can improve developability when the pigment dispersion composition is prepared into a color resist.

[Chemical Formula 1]

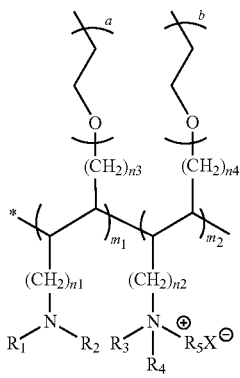

In the above Formula 1, $R_1$ to $R_5$ are the same or different and are independently hydrogen, substituted or unsubstituted alkyl, substituted or unsubstituted alkenyl, substituted or unsubstituted alkynyl, substituted or unsubstituted aryl, substituted or unsubstituted heteroaryl, substituted or unsubstituted arylalkyl, substituted or unsubstituted cycloalkyl, substituted or unsubstituted heterocycloalkyl, substituted or unsubstituted cycloalkenyl, substituted or unsubstituted cycloalkynyl, substituted or unsubstituted alkoxy, substituted or unsubstituted alkyl amino, substituted or unsubstituted alkoxy amino, or substituted or unsubstituted alkanol, X is halogen, sulfone, alkylsulfone, or hydroxy, $m_1$ ranges from 30 to 100 mol %, for example 50 to 100 mol %, $m_2$ ranges from 0 to 70 mol %, for example 0 to 50 mol %, $n_1$ to $n_4$ are the same or different and are independently integers ranging from 1 to 20, and a and b are the same or different and are independently integers ranging from 0 to 18.

In some embodiments, $m_1$ can be 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 mol %. Further, according to some embodiments of the present invention, the mol % of $m_1$ can be in a range from about any of the foregoing amounts to about any other of the foregoing amounts.

In some embodiments, $m_2$ can be 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 mol %. Further, according to some embodiments of the present invention, the mol % of $m_2$ can be in a range from about any of the foregoing amounts to about any other of the foregoing amounts.

The pigment dispersion composition of the invention can include the dispersing agent represented by the above Formula 1 in an amount of about 10 to about 80 parts by weight based on about 100 parts by weight of a pigment. In some embodiments, the pigment dispersion composition can include the dispersing agent represented by the above Formula 1 in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 parts by weight. Further, according to some embodiments of the present invention, the amount of the dispersing agent represented by the above Formula 1 can be in a range from about any of the foregoing amounts to about any other of the foregoing amounts.

When the pigment dispersion composition includes the dispersing agent in an amount within the above range, appropriate viscosity may be obtained, which can improve optical, physical, and chemical characteristics of the resultant products.

In addition, a first dispersing agent represented by the above Formula 1 can be mixed with a second dispersing agent represented by the following Formula 3.

[Chemical Formula 3]

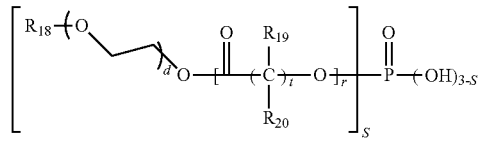

In the above Formula 3, $R_{18}$, $R_{19}$, and $R_{20}$ are the same or different and are independently hydrogen, substituted or unsubstituted alkyl, substituted or unsubstituted alkenyl, substituted or unsubstituted alkynyl, substituted or unsubstituted aryl, substituted or unsubstituted heteroaryl, substituted or unsubstituted arylalkyl, substituted or unsubstituted cycloalkyl, substituted or unsubstituted heterocycloalkyl, substituted or unsubstituted cycloalkenyl, substituted or unsubstituted cycloalkynyl, substituted or unsubstituted alkoxy, substituted or unsubstituted alkyl amino, substituted or unsubstituted alkoxy amino, or substituted or unsubstituted alkanol, d is an integer ranging from 0 to 20, t is an integer ranging from 1 to 20, r is an integer ranging from 1 to 40, and s is an integer ranging from 1 to 2.

Examples of the second dispersing agent may include without limitation DISPERBYK®-111, DISPERBYK®-110, and the like, and combinations thereof, made by BYK Co.

Including the second dispersing agent to prepare a pigment dispersion composition can improve pigment dispersion and significantly improve development.

When the first and second dispersing agents are mixed and used together, they can be mixed in a weight ratio of about 99:1 to about 50:50, for example a weight ratio of about 90:10 to about 60:40.

In some embodiments, the mixture of the first and second dispersing agents can include the first dispersing agent in an amount of about 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, or 50 weight % and can include the second dispersing agent in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 weight %. Further, according to some embodiments of the present invention, the amount of the first dispersing agent and the second dispersing agent can be in a range from about any of the foregoing amounts to about any other of the foregoing amounts.

When the first and second dispersing agents are mixed in a weight ratio within these ranges, they can provide fine dispersion and improve dispersion composition development when the composition is used to prepare a color resist.

The pigment dispersion composition can include the first and second dispersing agents in an amount of about 10 to about 80 parts by weight based on about 100 parts by weight of a pigment. In some embodiments, the pigment dispersion composition can include the first and second dispersing agents in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 parts by weight. Further, according to some embodiments of the present invention, the amount of the first and second dispersing agents can be in a range from about any of the foregoing amounts to about any other of the foregoing amounts.

When the pigment dispersion composition includes the first and second dispersing agents in an amount within the above range, appropriate viscosity may be obtained, which can improve physical, optical, and chemical characteristics of the resultant products.

In addition, the pigment dispersion composition may further include a third dispersing agent when needed. Examples of the third dispersing agent may include without limitation polycarbonic acid esters, unsaturated polyamides, polycarbonic acids, polycarbonic acid alkyl amine salts, polyacryls, polyethyleneimines, polyurethanes, polyethers, acryl resins, phosphoric acid esters, modified urethanes, and the like, and combinations thereof. The third dispersion agent can be used as singularly or as a mixture of two or more.

Examples of the third dispersing agent may include without limitation DISPERBYK® 161, DISPERBYK®163, and DISPERBYK®164 made by BYK Co, EFKA 4046 and EFKA 4047 made by EFKA, SOLSPERSE 24000 made by Lubrizol Co., and the like, and combinations thereof.

The third dispersing agent can be optionally used if necessary. The pigment dispersion composition can include the third dispersing agent in an amount of about 4 parts by weight or less, for example about 1 to about 4 parts by weight, based on about 100 parts by weight of a pigment. In some embodiments, the pigment dispersion composition may not include the third dispersing agent (i.e., the pigment dispersion composition may include zero parts of the third dispersing agent). In some embodiments, the pigment dispersion composition can include the third dispersing agent, for example in an amount greater than and/or about 0, 1, 2, 3, or 4 parts by weight. Further, according to some embodiments of the present invention, the amount of the third dispersing agent can be in a range from about any of the foregoing amounts to about any other of the foregoing amounts.

When the third dispersing agent is used in an amount within these ranges, the pigment dispersion composition may have excellent dispersion stability and development.

[C] Binder Resin

The binder resin may be a cardo-based binder resin represented by the following Formula 2.

[Chemical Formula 2]

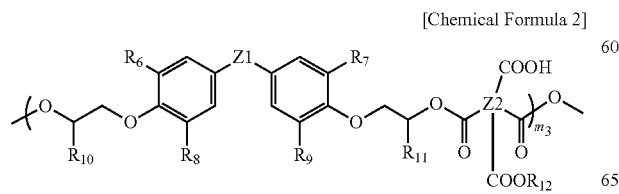

In the above Formula 2, $R_6$ to $R_9$ are the same or different and are independently hydrogen, halogen, or substituted or unsubstituted alkyl, $R_{10}$ and $R_{11}$ are the same or different and are independently $CH_2OR_{13}$ wherein $R_{13}$ is acryl, vinyl, or methacryl, $R_{12}$ is hydrogen, alkyl, acryl, vinyl or methacryl, $Z_1$ is $CO$, $SO_2$, $CR_{14}R_{15}$, $SiR_{16}R_{17}$, wherein $R_{14}$ to $R_{17}$ are the same or different and are independently hydrogen, fluoroalkyl, or alkyl, O, a single bond, or a unit represented by one of the following Formulae 4 to 14, $Z_2$ is a moiety derived from acid dianhydride, and $m_3$ is an integer ranging from 1 to 40.

[Chemical Formula 4]

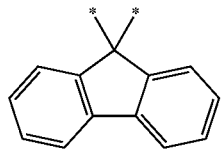

[Chemical Formula 5]

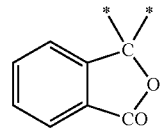

[Chemical Formula 6]

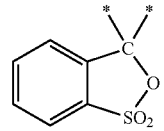

[Chemical Formula 7]

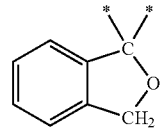

[Chemical Formula 8]

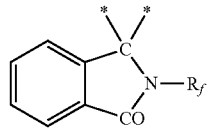

wherein in the above Formula 8, $R_f$ is hydrogen, ethyl, $C_2H_4Cl$, $C_2H_4OH$, $CH_2CH=CH_2$, or phenyl,

[Chemical Formula 9]

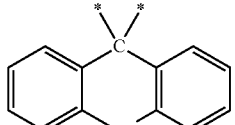

[Chemical Formula 10]

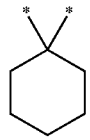

[Chemical Formula 11]
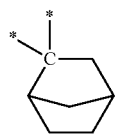

[Chemical Formula 12]
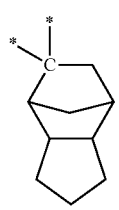

[Chemical Formula 13]
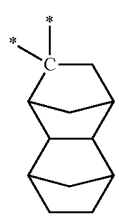

[Chemical Formula 14]
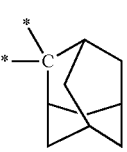

The $Z_2$ may be a moiety derived from acid dianhydride.

For example, the acid dianhydride may be benzenetetracarboxylic acid dianhydride, naphtalenetetracarboxylic acid dianhydride, biphenyltetracarboxylic acid dianhydride, benzophenonetetracarboxylic acid dianhydride, pyromellitic dianhydride, cyclobutanetetracarboxylic acid dianhydride, perylenetetracarboxylic acid dianhydride, tetrahydrofurantetracarboxylic acid dianhydride, or a combination thereof.

For the binder resin, the cardo-based binder resin may be used singularly or in combination with an acrylic-based resin.

Specific examples of the acrylic-based binder resin that can be used in combination with the cardo-based binder resin include without limitationacrylate-based copolymer resins obtained from one or more monomers of acrylic acid, methacrylic acid, esters of acrylic acid and/or methacrylic acid, including without limitation C1-C20 alkyl and/or C5-C20 aryl and alkyl aryl esters thereof such as methyl methacrylate, ethyl methacrylate, propyl methacrylate, ethylhexyl methacrylate, phenyl methacrylate, benzyl methacrylate, tolyl methacrylate, and the like, as well as o-silylmethacrylate, glycerolmethacrylate, succinic methacrylate, and the like. The monomers may be used singularly or in combination.

The cardo-based binder resin of the above Formula 2 and acrylic-based binder resin may be used at a weight ratio of about 100:0 to about 1:99. In some embodiments, the pigment dispersion composition may not include an acrylic binder resin (i.e., the pigment dispersion composition may include zero weight percent of the acrylic binder resin). In some embodiments, the pigment dispersion composition may include both the cardo-based binder resin and the acrylic-based binder resin. In exemplary embodiments, the pigment dispersion composition can include the cardo-based binder resin in an amount of about 100, 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1 weight % and can include the acrylic-based binder resin in an amount of greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 weight %. Further, according to some embodiments of the present invention, the amount of the cardo-based binder resin and the acrylic-based binder resin can be in a range from about any of the foregoing amounts to about any other of the foregoing amounts.

The pigment dispersion composition may include the binder resin i in an amount of about 1 to about 50 parts by weight, for example about 6 to about 50 parts by weight, based on about 100 parts by weight of the pigment. In some embodiments, the pigment dispersion composition can include the binder resin in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments of the present invention, the amount of the binder resin can be in a range from about any of the foregoing amounts to about any other of the foregoing amounts.

When the pigment dispersion composition includes the binder resin in an amount within the above range, effective dispersion may be obtained, which can improve physical, optical, and chemical characteristics of the resultant products.

[D] Solvent

The solvent is not specifically limited, and any generally-used solvent known in the art may be used singularly or in combination as needed. Examples of the solvent may include without limitation alcohols such as methanol, ethanol, and the like; ethers such as dichloroethyl ether, n-butyl ether, diisoamyl ether, methylphenyl ether, tetrahydrofuran, and the like; glycol ethers such as ethylene glycol monomethylether, ethylene glycol monoethylether, and the like; cellosolve acetates such as methyl cellosolve acetate, ethyl cellosolve acetate, diethyl cellosolve acetate, and the like; carbitols such as methylethyl carbitol, diethyl carbitol, diethylene glycol monomethylether, diethylene glycol monoethylether, diethylene glycol dimethylether, diethylene glycol methylethylether, diethylene glycol diethylether, and the like; propylene glycol alkylether acetates such as propylene glycol methylethyl acetate, propylene glycol methylether acetate, propylene glycol propylether acetate, and the like; aromatic hydrocarbons such as toluene, xylene, and the like; ketones such as methylethylketone, cyclohexanone, 4-hydroxy-4-methyl-2-pentanone, methyl-n-propylketone, methyl-n-butylketone, methyl-n-amylketone, 2-heptanone, and the like; saturated aliphatic monocarboxylic acid alkyl esters such as ethyl acetate, n-butyl acetate, isobutyl acetate, and the like; lactic acid esters such as methyl lactate, ethyl lactate, and the like; oxyacetate alkyl esters such as methyl oxyacetate, ethyl oxyacetate, butyl oxyacetate, and the like; alkoxy alkyl acetate esters such as methoxy methyl acetate, methoxy ethyl acetate, methoxy butyl acetate, ethoxy methyl acetate, ethoxy ethyl acetate, and the like; 3-oxy propionic acid alkyl esters such as 3-oxy methyl propionate, 3-oxy ethyl propionate, and the like; 3-alkoxy propionic acid alkyl esters such as 3-methoxy methyl propionate, 3-methoxy ethyl propionate, 3-ethoxy ethyl propionate, 3-ethoxy methyl propionate, and the like; 2-oxy propionic acid alkyl esters such as 2-oxy methyl propionate, 2-oxy ethyl propionate, 2-oxy propyl propionate, and the like; 2-alkoxy propionic acid alkyl esters such as 2-methoxy methyl propionate, 2-methoxy ethyl propionate, 2-ethoxy ethyl propionate, 2-ethoxy methyl propionate, and the like; 2-oxy-2-methyl propionic acid esters such as 2-oxy-2-methyl methyl propionate, 2-oxy-2-methyl ethyl propionate, and the like; monooxy monocarboxylic acid alkyl esters of a 2-alkoxy-2-methyl propionic acid alkyl such as 2-methoxy-2-methyl methyl propionate, 2-ethoxy-2-methyl ethyl propionate, and the like; esters such as 2-hydroxy ethyl propionate, 2-hydroxy-2-methyl ethyl propionate, hydroxy ethyl acetate, 2-hydroxy-3-methyl methyl butanoate, and the like; and ketonic acid esters such as ethyl pyruvate. Further non-limiting examples of the solvent may include N-methylformamide, N,N-dimethyl formamide, N-methylformanilide, N-methylacetamide, N,N-dimethyl acetamide, N-methylpyrrolidone, dimethylsulfoxide, benzylethylether, dihexylether, acetonyl acetone, isophorone, caproic acid, caprylic acid, 1-octanol, 1-nonanol, benzylalcohol, benzyl acetate, ethyl benzoate, diethyl oxalate, diethyl maleate, γ-butyrolactone, ethylene carbonate, propylene carbonate, phenyl cellosolve acetate, and the like. The solvent may be used singularly or in combination.

Of the above solvents, glycol ethers such as ethylene glycol monoethyl ether; cellosolve acetates such as ethyl cellosolve acetate; esters such as 2-hydroxy ethyl propionate; carbitols such as diethylene glycol monomethyl ether; and propylene glycol alkylether acetates such as propylene glycol methylether acetate, propylene glycol propylether acetate, and the like may be appropriate in terms of compatibility and reactivity.

The solvent may be used in an amount of about 10 to about 1000 parts by weight, for example about 20 to about 500 parts by weight based on about 100 parts by weight of the pigment. When the pigment dispersion composition includes the solvent in an amount within the above range, appropriate viscosity may be obtained, which can improve physical and optical characteristics of the resultant products.

[E] Other Additive

A pigment dispersion composition of the present invention may further include a color derivative.

The term color derivative refers to a pigment derivative or a dye derivative in which a substituent such as but not limited to a sulfone, an amine, a triazine, or a combination thereof is added to a pigment or a dye (such as a pigment ([A] component described herein); a pigment combined with a dye derivative including a substituent such as but not limited to a sulfone, an amine, a triazine, or a combination thereof; or a pigment derivative including a substituent such as but not limited to a sulfone, an amine, a triazine, or a combination thereof combined with a dye.

In exemplary embodiments, the color derivative can be prepared by substituting a naphthalene-based, anthraquinone-based, phthalocyanine-based, diketopyrrolopyrrol-based, azo-based, dioxazine-based, and/or isoindoline-based pigment and/or dye with sulfonic acid amine salt, sulfonic acid sodium salt, sulfone imide, quaternary amine salt, an alkylamine, a triazine derivative, and the like.

The pigment dispersion composition can include the color derivative in an amount of about 1 to about 10 parts by weight based on about 100 parts by weight of a pigment. In some embodiments, the pigment dispersion composition can include the color derivative in an amount of about 1, 2, 3, 4, 5, 6, 7, 8, 9, or 10 parts by weight. Further, according to some embodiments of the present invention, the amount of the color derivative can be in a range from about any of the foregoing amounts to about any other of the foregoing amounts.

When the pigment dispersion composition includes a color derivative in an amount of less than about 1 part by weight, the color derivative can be too finely dispersed. Including a color derivative in an amount of more than about 10 parts by weight may increase viscosity and decrease development.

According to another embodiment of the present invention, provided is a resist composition for a color filter prepared by using the pigment dispersion composition.

The resist composition for a color filter may include a pigment dispersion composition, an alkali soluble resin, a photopolymerization monomer, a photopolymerization initiator, and a solvent.

The pigment dispersion composition may be the same as aforementioned.

The alkali soluble resin can be an acrylic-based binder resin with a carboxyl group, such as a copolymer of a first ethylenic unsaturated monomer including at least one carboxyl group and another ethylenic unsaturated monomer copolymerizable with the first ethylenic unsaturated monomer.

The copolymer can include the ethylenic unsaturated monomer including at least one carboxyl group in an amount of about 10 to about 40 wt %, for example about 20 to about 30 wt %, based on the total weight of the copolymer. In some embodiments, the copolymer can include the ethylenic unsaturated monomer including at least one carboxyl group in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the ethylenic unsaturated monomer including at least one carboxyl group can be in a range from about any of the foregoing amounts to about any other of the foregoing amounts.

The acrylic-based binder resin including a carboxyl group can have a molecular weight (Mw) of about 10,000 to about 70,000, for example about 20,000 to about 50,000.

Examples of the ethylenic unsaturated monomer including at least one carboxyl group include without limitation acrylic acid, methacrylic acid, maleic acid, itaconic acid, fumaric acid, succinic acid, and the like, and combinations thereof. The alkali soluble resin can include at least one monomer described above.

Examples of the other ethylenic unsaturated monomer copolymerizable with the ethylenic unsaturated monomer including at least one carboxyl group include without limitation styrenic monomers such as styrene, α-methyl styrene, vinyl toluene; vinyl benzyl methyl ether, and the like; unsaturated carbonic acid esters such as methyl acrylate, methyl methacrylate, ethyl acrylate, ethyl methacrylate, butyl acrylate, butyl methacrylate, 2-hydroxy ethyl acrylate, 2-hydroxy ethyl methacrylate, 2-hydroxy butyl acrylate, 2-hydroxy butyl methacrylate, benzyl acrylate, benzyl methacrylate, cyclohexyl acrylate, cyclohexyl methacrylate, phenyl acrylate, phenyl methacrylate, and the like; unsaturated carbonic acid amino alkyl esters such as 2-amino ethyl acrylate, 2-amino ethyl methacrylate, 2-dimethyl amino ethyl acrylate, 2-dimethyl amino ethyl methacrylate, and the like; carbonic acid vinyl esters such as vinyl acetate, vinyl benzoate, and the like; unsaturated carbonic acid glycidyl esters such as glycidyl acrylate, glycidyl methacrylate, and the like; vinyl cyanide compounds such as acrylonitrile, methacrylonitrile, and the like; and unsaturated amides such as acryl amide, methacryl amide, and the like; and combinations thereof. The alkali soluble resin is obtained from at least one monomer described above.

Specific examples of the alkali soluble resin obtained from the monomers above include, but are not limited to, methacrylic acid/methyl methacrylate copolymers, methacrylic acid/benzyl methacrylate copolymers, methacrylic acid/benzylmethacrylate/styrene copolymers, methacrylic acid/benzylmethacrylate/2-hydroxy ethyl methacrylate copolymers, and methacrylic acid/benzylmethacrylate/styrene/2-hydroxy ethyl methacrylate copolymers, and the like, and combinations thereof.

The color filter resist composition can include the alkali soluble resin in an amount of about 0.5 to about 20 wt % based on the total weight of the color filter resist composition. In some embodiments, the color filter resist composition can include the alkali soluble resin in an amount of about 0.5, 0.6, 0.7, 0.8, 0.9, 1, 2, 3, 4, 5, 6, 7, 8, 9, 10, 11, 12, 13, 14, 15, 16, 17, 18, 19, or 20 wt %. Further, according to some embodiments of the present invention, the amount of the alkali soluble resin can be in a range from about any of the foregoing amounts to about any other of the foregoing amounts.

When the alkali soluble resin is included in an amount within the range, the composition can provide excellent cross-linking and development and can be developed in an alkali development solution.

The alkali soluble resin is one of the most influential factors on resolution of pixels in the present invention. For example, when the alkali soluble resin is a methacrylic acid/benzyl methacrylate copolymer, there can be a significant resolution difference of pixels depending on the acid value and molecular weight of the copolymer. As a non-limiting example, when the methacrylic acid and benzyl methacrylate monomers are included in the copolymer in a ratio of about 25 mol %:75 mol %, and the copolymer has an acid value ranging from about 80 to about 120 KOHmg/g, and a molecular weight ranging from about 10,000 to about 40,000, the pixels can have the best resolution.

The photopolymerization monomer may include a multifunctional monomer including at least two hydroxyl groups. Examples of the photopolymerization monomer include without limitation dipentaerythrytol hexaacrylate, ethyleneglycol diacrylate, triethyleneglycol diacrylate, 1,4-butanediol diacrylate, 1,6-hexanediol diacrylate, neopentylglycol diacrylate, pentaerythrytol diacrylate, pentaerythrytol triacrylate, dipentaerythrytol diacrylate, dipentaerythrytol triacrylate, dipentaerythrytol pentaacrylate, pentaerythrytol hexaacrylate, bisphenol A diacrylate, trimethylolpropane triacrylate, novolace polyacrylate, ethyleneglycol dimethacrylate, diethyleneglycol dimethacrylate, triethyleneglycol dimethacrylate, propyleneglycol dimethacrylate, 1,4-butanediol dimethacrylate, 1,6-hexanediol dimethacrylate, and the like, and combinations thereof.

The color filter resist composition can include the photopolymerization monomer in an amount of about 1 to about 20 wt % based on the total weight of the color filter resist composition. In some embodiments, the color filter resist composition can include the photopolymerization monomer in an amount of about 1, 2, 3, 4, 5, 6, 7, 8, 9, 10, 11, 12, 13, 14, 15, 16, 17, 18, 19, or 20 wt %. Further, according to some embodiments of the present invention, the amount of the photopolymerization monomer can be in a range from about any of the foregoing amounts to about any other of the foregoing amounts.

When the photopolymerization monomer is included in an amount of less than about 1 wt %, the film to not be sufficiently cured after the pattern formation, which can decrease film strength. When the photopolymerization monomer is included in an amount of more than about 20 wt %, viscosity of the composition can increase, which can reduce storage stability.

The photopolymerization initiator may be any generally-used photopolymerization initiator for a photosensitive resin composition. Examples of the photopolymerization initiator include without limitation acetophenone-based compounds, benzophenone-based compounds, thioxanthone-based compounds, benzoin-based compounds, triazine-based compounds, and the like, and the like, and combinations thereof.

Examples of the triazine-based compound include without limitation 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-biphenyl-4,6-bis(trichloro methyl)-s-triazine, bis(trichloromethyl)-6-styryl-s-triazine, 2-(naphto 1-yl)-4,6-bis(trichloro methyl)-s-triazine, 2-(4-methoxy naphto 1-yl)-4,6-bis(trichloro methyl)-s-triazine, 2-4-trichloro methyl(piperonyl)-6-triazine, 2-4-trichloromethyl (4'-methoxy styryl)-6-triazine, and the like, and combinations thereof.

Examples of the acetophenone-based compound include without imitation 2,2'-diethoxyacetophenone, 2,2'-dibutoxyacetophenone, 2-hydroxy-2-methyl propiophenone, p-t-butyltrichloroacetophenone, p-t-butyldichloroacetophenone, 4-chloroacetophenone, 2,2'-dichloro-4-phenoxyacetophenone, 2-methyl-1-(4-(methylthio)phenyl)-2-morpholinopropari-1-one, 2-benzyl-2-dimethylamino-1-(4-morpholinophenyl)-butan-1-one, and the like, and combinations thereof.

Examples of the benzophenone-based compound include without limitation benzophenone, benzoyl benzoate, benzoyl methyl benzoate, 4-phenyl benzophenone, hydroxy benzophenone, acrylated benzophenone, 4,4'-bis(dimethyl amino)benzophenone, 4,4'-bis(diethylamino)benzophenone, 4,4'-dimethylamino benzophenone, 4,4'-dichloro benzophenone, 3,3'-dimethyl-2-methoxy benzophenone, and the like, and combinations thereof.

Examples of the thioxanthone-based compound include without limitation thioxanthone, 2-methylthioxanthone, isopropyl thioxanthone, 2,4-diethyl thioxanthone, 2,4-diisopropyl thioxanthone, 2-chlorothioxanthone, and the like, and combinations thereof.

Examples of the benzoin-based compound include without limitation benzoin, benzoin methyl ether, benzoin ethyl ether, benzoin isopropyl ether, benzoin isobutyl ether, benzyldimethylketal, and the like, and combinations thereof.

Other exemplary photopolymerization initiators may include without limitation carbazole-based compounds, diketone-based compounds, sulfonium borate-based compounds, diazo-based compounds, biimidazole-based compounds, and the like, and combinations thereof.

In exemplary embodiments, the photopolymerization initiator may be a triazine-based compound such as a triazine-based compound that can influence the performance of a pixel pattern at a maximum photo-absorption wavelength ($\lambda$max) of 340 to 380 nm.

The color filter resist composition may include the photopolymerization initiator in an amount of about 0.1 to about 10 wt % based on the total weight of the color filter resist composition. In some embodiments, the color filter resist composition can include the photopolymerization initiator in an amount of about 0.1, 0.2, 0.3, 0.4, 0.5, 0.6, 0.7, 0.8, 0.9, 1, 2, 3, 4, 5, 6, 7, 8, 9, or 10 wt %. Further, according to some embodiments of the present invention, the amount of the photopolymerization initiator can be in a range from about any of the foregoing amounts to about any other of the foregoing amounts.

When the color filter resist composition includes the photopolymerization initiator in an amount within this range, the photopolymerization initiator may facilitate sufficient photopolymerization in the pattern forming process during exposure. If the color filter resist composition includes the photopolyermization initiator in an amount greater than about 10 wt %, remaining unreactive initiator after the photopolymerization may deteriorate transmittance.

The solvent may be the same as the solvent used for the pigment dispersion composition according to the present invention. The solvent may be used in a balance amount.

Furthermore, the color filter resist composition may further include a cardo-based binder resin.

The color filter resist composition can be prepared by dissolving a photopolymerization initiator in a solvent and agitating the mixture for about 2 hours at room temperature (S1), adding an alkali soluble resin and a photopolymerization monomer thereto and agitating the product at room temperature for about 2 hours (S2), and adding a pigment dispersion solution thereto and agitating it for about 1 hour (S3), and then filtrating it three times to remove impurities.

In addition, the resist composition for a color filter can be prepared by mixing [A] a pigment, [B] a dispersing agent, [C] a cardo-based binder resin, [D] a solvent, an alkali soluble resin, a photopolymerization monomer, and a photopolymerization initiator rather than separately preparing a pigment dispersion solution.

According to still another embodiment of the present invention, provided is a color filter prepared by using a resist composition for a color filter prepared by the pigment dispersion composition.

The color filter may be fabricated by a method including: coating the resist composition including the pigment dispersion composition on a wafer for a color filter in a thickness of about 5000 to about 8000 Å using a coating process such as spin coating, slit coating, and the like; irradiating the coated resist composition including the pigment dispersion composition layer to obtain a required pattern for the color filter; and treating the coating layer with an alkali developing solution to dissolve a non-exposed part of the coating layer and to provide a color filter having a required pattern. The light source for the irradiation may include 356 nm I-line light, but is not limited thereto.

The process may be repeated depending upon the required number of colors of red (R), green (G), and blue (B), so as to provide a color filter having a desired pattern. During the fabricating process, the image pattern obtained after the development step may be hardened by reheating or irradiating with an actinic ray to improve crack-resistance, solvent-resistance, and the like.

It is thereby possible to provide a color filter having a fine pixel with a micro-square pattern. Accordingly, the color filter fabricated using the resist composition for a color filter can exhibit high resolution when it is used in an image sensor.

Hereinafter, the present invention is illustrated in more detail with reference to examples. However, they are exemplary embodiments of present invention and are not limiting.

1. Preparation of a Pigment Dispersion Composition

EXAMPLE 1

A pigment dispersion composition is prepared to have the following composition by using a bead mill for 3 hours for dispersion.

C. I. Pigment Red 254 15 parts by weight
(Ciba Specialty Chemicals, Irgaphor Red BT-CF)
5 parts by weight of LP-21357 (dispersing agent of Chemical Formula 1) (BYK Co.)
2 parts by weight of Disperbyk111 (a dispersing agent of Chemical Formula 3) (BYK Co.)
5 parts by weight of V259ME (a cardo-based resin of Chemical Formula 2) (Nippon Steel Chemical Co.)
55 parts by weight of propylene glycol methylethylacetate

EXAMPLE 2

A pigment dispersion composition is prepared according to the same method as in Example 1, except 2 parts by weight of Disperbyk111 (BYK Co) is not used.

COMPARATIVE EXAMPLE 1

A pigment dispersion composition is prepared under the same conditions as in Example 1, except for changing the composition as follows.

C. I. Pigment Red 254 15 parts by weight
(Ciba Specialty Chemicals, Irgaphor Red BT-CF)
5 parts by weight of LP-21357 (a dispersing agent of Chemical Formula 1) (BYK Co.)
2 parts by weight of Disperbyk111 (a dispersing agent of Chemical Formula 3) (BYK Co.)
5 parts by weight of an acrylic acid benzylmethacrylate copolymer (Miwon Commercial Co., Ltd., NPR8000)
55 parts by weight of propyleneglycol methylethylacetate

COMPARATIVE EXAMPLE 2

A pigment dispersion composition is prepared under the same conditions as in Example, 1 except for changing the composition as follows.

15 parts by weight of C. I. Pigment Red 254
(Ciba Specialty Chemicals, Irgaphor Red BT-CF)
5 parts by weight of a polyimine-based dispersing agent
(EFKA Inc., EFKA4046)
5 parts by weight of an acrylic acid benzylmethacrylate copolymer
(Miwon Commercial Co., Ltd., NPR8000)
55 parts by weight of propylene glycol methylethylacetate 2. Primary Average Particle Diameter of a Pigment The average particle diameter (dispersion particle size) of the pigment dispersion compositions of Examples 1 and 2 and Comparative Examples 1 and 2 are measured using a light-scattering particle size analyzer (Horiba Ltd., LB-500) and the viscosity thereof is measured using a viscosity analyzer (Brookfield Co.—DVIII Ultra). The results are provided in the following Table 1.

TABLE 1

| Pigment dispersion composition | Example 1 | Example 2 | Comparative Example 1 | Comparative Example 2 |
|---|---|---|---|---|
| Average particle diameter of pigment (nm) | 60 | 65 | 70 | 90 |
| Viscosity (cP) | 5 | 6.5 | 10 | 7 |

Referring to Table 1, the pigment dispersion compositions of Examples 1 and 2 include remarkably fine pigment particles compared with the ones of Comparative Examples 1 and 2, but viscosity thereof is not increased. Accordingly, the pigment dispersion compositions of Examples 1 and 2 have excellent dispersion stability.

3. Preparation of a Color Resist Composition

EXAMPLE 3

The pigment dispersion composition of Example 1 is used to prepare a color resist composition with the following composition through agitating processes by using a formulator for one hour.

50 parts by weight of the pigment dispersion composition of Example 1

4 parts by weight of an acrylic acid benzylmethacrylate copolymer (Miwon commercial Co., Ltd., NPR8000)

4 parts by weight of a photopolymerization monomer (Dongyang SYN Co.; Ltd., DPHA)

41.5 parts by weight of propyleneglycol methylethylacetate 0.5 parts by weight of a triazine-based photopolymerization initiator (Nippon Kayaku Co., Ltd., TPP)

EXAMPLE 4

A resist composition for a color filter is prepared according to the same method as Example 3, except for using the pigment dispersion composition of Example 2.

COMPARATIVE Example 3

A resist composition for a color filter is prepared according to the same method as Example 2, except for using the pigment dispersion composition of Comparative Example 1.

COMPARATIVE EXAMPLE 4

A color resist composition is prepared according to the same method as Example 2, except for using the pigment dispersion composition of Comparative Example 2.

4. Scanning Electron Microscope (SEM) Analysis of Patterns for a Color Filter

The resist compositions for a color filter of Examples 3 and 4 and Comparative Examples 3 and 4 are coated to a thickness of 0.8 µm on a silicon wafer (LG Siltron Inc.) using a spin coater (KDNS Co., Ltd., K-Spin8), then exposed to light for 200 ms using an exposer (Nikon Co., I10C) and developed with a development solution (TMAH: tetramethyl ammonium hydroxide) to form a pattern. Resolution and residue of the patterns are examined with a CD SEM analyzer (KLA-Tencor Co., 8100XP).

FIGS. 1 to 4 respectively show resolution of the patterns prepared by coating the resist compositions for a color filter according to Examples 3 and 4 and Comparative Examples 3 and 4 and then exposing them to light and developing them.

Figure 2:
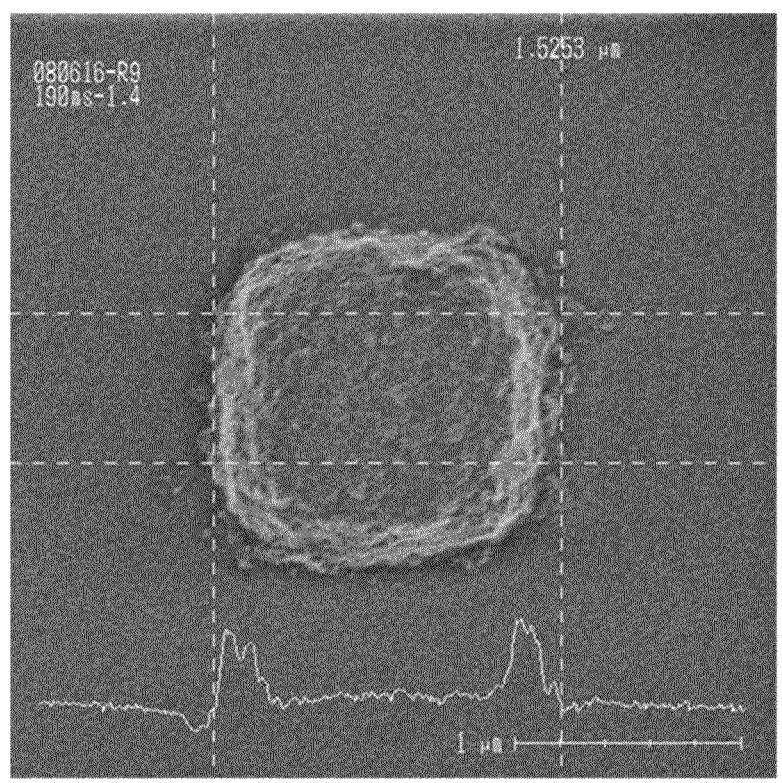
FIG. 2 is a SEM (scanning electron microscope) photograph of a pattern fabricated using the color resist including the pigment dispersion composition according to Example 4.
Figure 3:
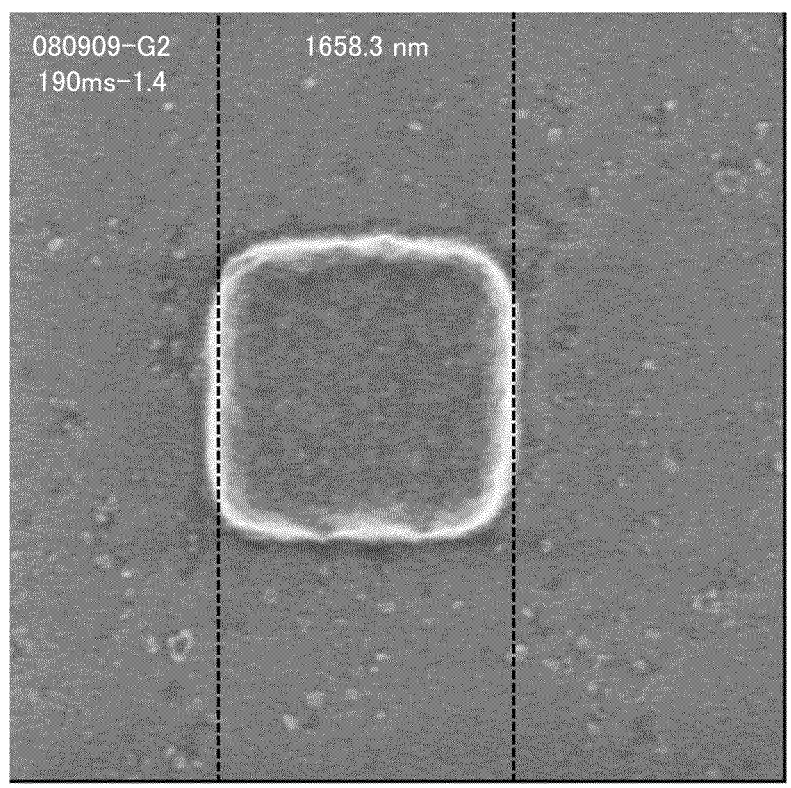
FIG. 3 is a SEM (scanning electron microscope) photograph of a pattern fabricated using the color resist including the pigment dispersion composition according to Comparative Example 3.
Figure 4:
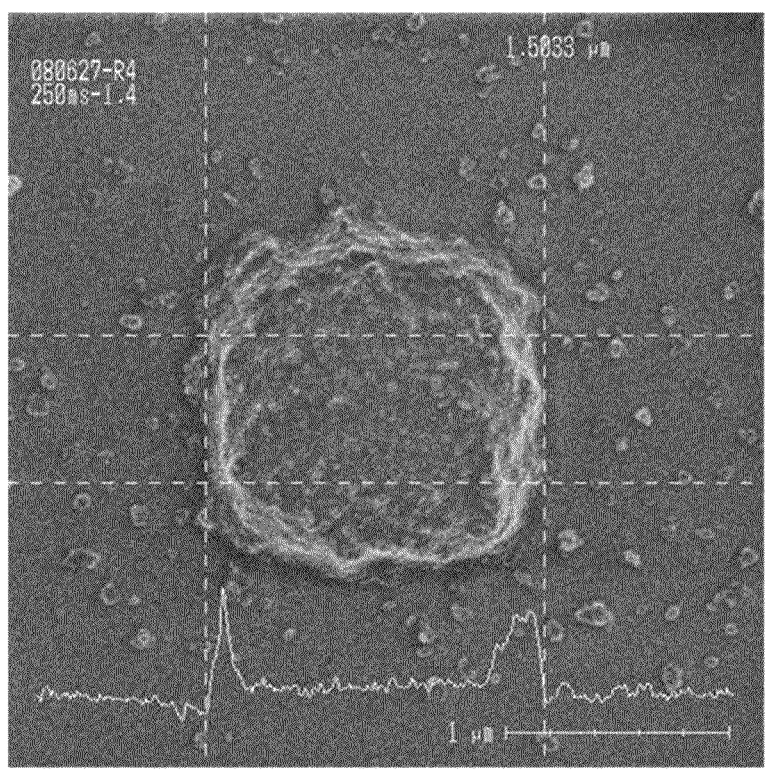
FIG. 4 is a SEM (scanning electron microscope) photograph of a pattern fabricated using the color resist including the pigment dispersion composition according to Comparative Example 4.

Referring to FIGS. 1 to 4, the patterns of Examples 3 and 4 in FIGS. 1 and 2 have remarkably excellent resolution forming a square compared with the ones of Comparative Examples 3 and 4 in FIGS. 3 and 4. In addition, FIGS. 3 and 4 show a great deal of residue compared with the FIGS. 1 and 2.

Therefore, when a pattern is formed by using a pigment dispersion composition including a first dispersing agent of Chemical Formula 1 and a cardo-based binder resin of Chemical Formula 2 according to the present invention, it can improve resolution and also decrease residue of an image.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A pigment dispersion composition comprising:
   [A] a pigment;
   [B] a dispersing agent of the following Formula 1;
   [C] a cardo-based binder resin of the following Formula 2; and
   [D] a solvent

[Chemical Formula 1]

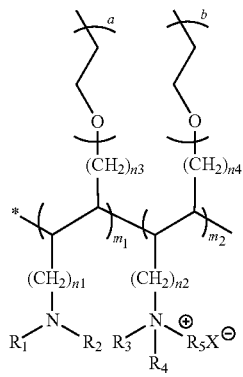

wherein, in the above Formula 1, $R_1$ to $R_5$ are the same or different and are independently hydrogen, substituted or unsubstituted alkyl, substituted or unsubstituted alkenyl, substituted or unsubstituted alkynyl, substituted or unsubstituted aryl, substituted or unsubstituted heteroaryl, substituted or unsubstituted arylalkyl, substituted or unsubstituted cycloalkyl, substituted or unsubstituted heterocycloalkyl, substituted or unsubstituted cycloalkenyl, substituted or unsubstituted cycloalkynyl, substituted or unsubstituted alkoxy, substituted or unsubstituted alkyl amino, substituted or unsubstituted alkoxy amino, or substituted or unsubstituted alkanol, X is halogen, sulfone, alkylsulfone, or hydroxy, $m_1$ ranges from 30 to 100 mol %, $m_2$ ranges from 0 to 70 mol %, $n_1$ to $n_4$ are the same or different and are independently integers ranging from 1 to 20, and a and b are the same or different and are independently integers ranging from 0 to 18,

[Chemical Formula 2]

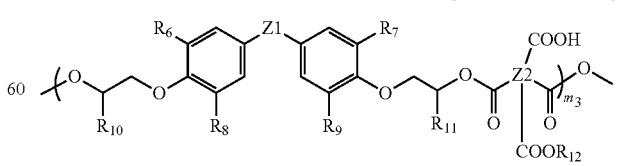

wherein, in the above Formula 2, $R_6$ to $R_9$ are the same or different and are independently hydrogen, halogen, or substituted or unsubstituted alkyl, $R_{10}$ and $R_{11}$ are the same or different and are independently $CH_2OR_{13}$, wherein $R_{13}$ is acryl, vinyl, or methacryl, $R_{12}$ is hydrogen, alkyl, acryl, vinyl, or methacryl, $Z_1$ is CO, $SO_2$, $CR_{14}R_{15}$, $SiR_{16}R_{17}$ wherein $R_{14}$ to $R_{17}$ are the same or different and are independently hydrogen, fluoroalkyl, or alkyl, O, a single bond, or a unit represented by one of the following Formulae 4 to 14, $Z_2$ is a moiety derived from acid dianhydride, and $m_3$ is an integer ranging from 1 to 40,

[Chemical Formula 4]

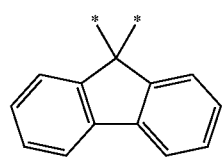

[Chemical Formula 5]

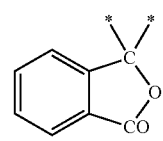

[Chemical Formula 6]

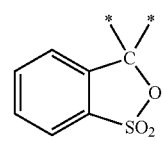

[Chemical Formula 7]

[Chemical Formula 8]

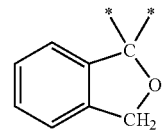

wherein, the above Formula 8, $R_f$ is hydrogen, ethyl, $C_2H_4Cl$, $C_2H_4OH$, $CH_2CH=CH_2$, or phenyl,

[Chemical Formula 9]

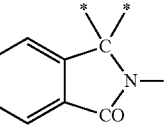

[Chemical Formula 10]

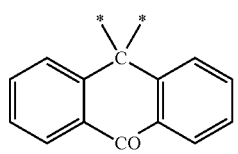

[Chemical Formula 11]

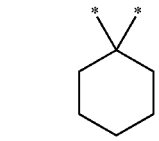

[Chemical Formula 12]

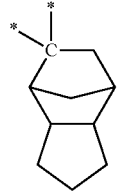

[Chemical Formula 13]

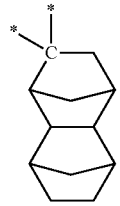

[Chemical Formula 14]

2. The pigment dispersion composition of claim 1, wherein the dispersing agent comprises a first dispersing agent represented by the above Formula 1 and a second dispersing agent represented by the following Formula 3:

[Chemical Formula 3]

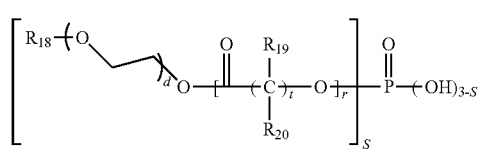

wherein in the above Formula 3, $R_{18}$, $R_{19}$, and $R_{20}$ are the same or different and are independently hydrogen, substituted or unsubstituted alkyl, substituted or unsubstituted alkenyl, substituted or unsubstituted alkynyl, substituted or unsubstituted aryl, substituted or unsubstituted heteroaryl, substituted or unsubstituted arylalkyl, substituted or unsubstituted cycloalkyl, substituted or unsubstituted heterocycloalkyl, substituted or unsubstituted cycloalkenyl, substituted or unsubstituted cycloalkynyl, substituted or unsubstituted alkoxy, substituted or unsubstituted alkyl amino, substituted or unsubstituted alkoxy amino, or substituted or unsubstituted alkanol, d is an integer ranging from 0 to 20, t is an integer ranging from 1 to 20, r is an integer ranging from 1 to 40, and s is an integer ranging from 1 to 2.

3. The pigment dispersion composition of claim 2, wherein the first dispersing agent and the second dispersing agent are mixed in a weight ratio ranging from about 99:1 to about 50:50.

4. The pigment dispersion composition of claim 1, wherein the composition comprises about 1 to about 50 parts by weight of the cardo-based binder resin, about 10 to about 1000 parts by weight of the solvent, and about 10 to about 80 parts by weight of the dispersing agent, each based on about 100 parts by weight of the pigment.

5. The pigment dispersion composition of claim 1, wherein the composition comprises a third dispersing agent comprising a polycarbonic acid ester, an unsaturated polyamide, a polycarbonic acid, polycarbonic acid, an alkyl amine, a polyacryl, a polyethyleneimine, a polyurethane, a polyether, an acryl resin, phosphoric acid ester, a modified urethane, or a combination thereof.

6. The pigment dispersion composition of claim 1, wherein the pigment has an average particle diameter ranging from about 30 to about 100 nm.

7. The pigment dispersion composition of claim 1, wherein the pigment comprises red dipyrrolopyrrol pigment, red anthraquinone pigment, copper phthalocyanine pigment replaced with green halogen, blue copper phthalocyanine pigment, yellow isoindoline pigment, yellow quinophthalone pigment, yellow nickel complex pigment, or a combination thereof.

8. The pigment dispersion composition of claim 1, wherein the composition comprises about 1 to about 10 parts by weight of a color derivative pigment based on about 100 parts by weight of the pigment.

9. The pigment dispersion composition of claim 8, wherein the color derivative comprises a naphthalene-based, anthraquinone-based, phthalocyanine-based, diketopyrrolopyrrol-based, azo-based, dioxazine-based, or isoindoline-based pigment or dye including a sulfonic acidamine salt, a sulfonic acidsodium salt, a sulfoneimide, a quaternary amine salt, an alkylamine, a triazine derivative, or a combination thereof.

10. A resist composition for a color filter comprising the pigment dispersion composition according to claim 1.

11. A color filter fabricated by using the resist composition of claim 10.

* * * * *